United States Patent
Rauh et al.

(10) Patent No.: US 6,676,207 B2
(45) Date of Patent: Jan. 13, 2004

(54) VEHICLE SEAT

(75) Inventors: Hans-Georg Rauh, Olching (DE); Stefan Stowe, Mering (DE)

(73) Assignee: W.E.T. Automotive Systems AG (DE)

( * ) Notice: Subject to any disclaimer, the term of this patent is extended or adjusted under 35 U.S.C. 154(b) by 0 days.

(21) Appl. No.: 10/059,584

(22) Filed: Jan. 29, 2002

(65) Prior Publication Data

US 2002/0105213 A1 Aug. 8, 2002

(30) Foreign Application Priority Data

Feb. 5, 2001 (DE) .......................... 101 05 094

(51) Int. Cl.[7] .............................................. A47C 31/00
(52) U.S. Cl. ................................................. 297/180.14
(58) Field of Search ........................ 297/180.1, 180.12, 297/180.13, 180.14, 452.42

(56) References Cited

U.S. PATENT DOCUMENTS 3,136,577 A * 6/1964 Richard
5,613,730 A * 3/1997 Buie et al.
5,934,748 A * 8/1999 Faust et al.
6,079,485 A * 6/2000 Esaki et al.
6,186,592 B1 * 2/2001 Orizaris et al.
6,278,090 B1 * 8/2001 Fristedt et al.
6,291,803 B1 * 9/2001 Fourrey
6,439,658 B1 * 8/2002 Ganz et al.

* cited by examiner

Primary Examiner—Milton Nelson, Jr.

(57) ABSTRACT

A vehicle seat including at least one pad (12) having an air-permeable surface area (16). In the region of the air-permeable surface area (16) of the pad, an air-permeable heating element (18) is arranged to heat the surface area (16) of the pad. A fan unit (24) blows air through the heating element (18) and the surface area (16) of the pad. A first temperature sensor (26) detects the temperature of the surface area (16) or of the heating element (18). A second temperature sensor (30) detects the temperature of the air aspirated by the fan (24). A fan regulator (32) regulates the volume flow of air as a function of the temperature detected by the second temperature sensor (30).

19 Claims, 1 Drawing Sheet

VEHICLE SEAT

TECHNICAL FIELD

The present invention relates to a vehicle seat and, in particular, concerns a vehicle seat with temperature control.

BACKGROUND

U.S. Pat. No. 5,934,748 discloses a vehicle seat the backrest of which a fan means is provided, supplying air aspirated from the passenger compartment to the surface of the backrest pad by way of a heating means. In the part of the backrest pad to be occupied by the lumbar region of an occupant, a temperature sensor is provided for adjusting the seat "climate." A regulating means is provided, connected to the temperature sensor at the input end and to the fan means and heating means at the output end. In the regulating means, a control algorithm is stored, according to which both the heating means and the fan means are regulated relative to the temperature of the pad surface as measured by the temperature sensor. This requires a very complicated control algorithm, since both the operation of the heating means and the operation of the fan means must be readjusted by the user from time to time in selecting the desired seat temperature. Furthermore, there is the problem that the heating means is able to heat only a limited flow of air at a physiologically acceptable temperature level when temperatures in the interior of the vehicle are very low.

SUMMARY OF THE INVENTION

The present invention provides a vehicle seat having an improved design whereby the seat climate control is adapted to the internal temperature of the vehicle with a simplified control scheme.

In particular, the present invention provides a vehicle seat having at least one pad with an air-permeable surface area. An air-permeable heater element is arranged in the region of the air-permeable surface area of the pad to heat the surface area of the pad. The seat further includes a fan proximate the heating element to force air through the heating element and the surface area of the pad. A first temperature sensor detects the temperature of the surface area of the pad and/or the heating element. A second temperature sensor monitors the temperature of the air aspirated by the fan. A controller in operative communication with the first and second temperature sensors regulates the valve flow of air of the fan as a function of the second temperature sensor signal.

With the vehicle seat according to the present invention, the fan automatically adjusts the required volume flow of air through the pad as a function of the internal vehicle temperature. At low air temperatures, the fan delivers a small volume flow of air, whereas at high temperatures, it will deliver a large volume flow of air. This ensures that the volume flow of air can be heated to a physiologically acceptable temperature level even when the internal temperature of the vehicle is low.

An advantage of the present invention is that the temperature of the heater element is regulated independently of the fan operation. For this reason, a simple control algorithm can be employed for the heater as a function of the first temperature sensor.

The controller may regulate the volume flow of air on the basis of a characteristic curve representing a function of the temperature detected by the second temperature sensor. However, the characteristic curve may alternatively represent a function of the difference between the temperature detected by the first temperature sensor and the temperature detected by the second temperature sensor.

In one embodiment, at least the second temperature sensor is a negative temperature coefficient (NTC) sensor.

Advantageously, an operating scheme is provided by which the target temperature of the heating element can be set, and the fan can be switched on and off.

The information acquired by the second temperature sensor by way of the air inside the vehicle may be supplied by way of an electronic BUS system associated with the heating, ventilation and air-conditioning (HVAC) system of the vehicle. In this way, the HVAC system and seating system can communicate to share information, or the HVAC system can be provided additional temperature data from the seat system.

Other advantages and features of the invention will become apparent upon reading the following detailed description and appended claims, and upon reference to the accompanying drawings.

BRIEF DESCRIPTION OF THE DRAWINGS

For a more complete understanding of the invention, reference should now be made to the embodiments illustrated in greater detail in the accompanying drawings and described below by way of examples of the invention.

In the drawings.

DETAILED DESCRIPTION OF THE INVENTION

Figure 1:
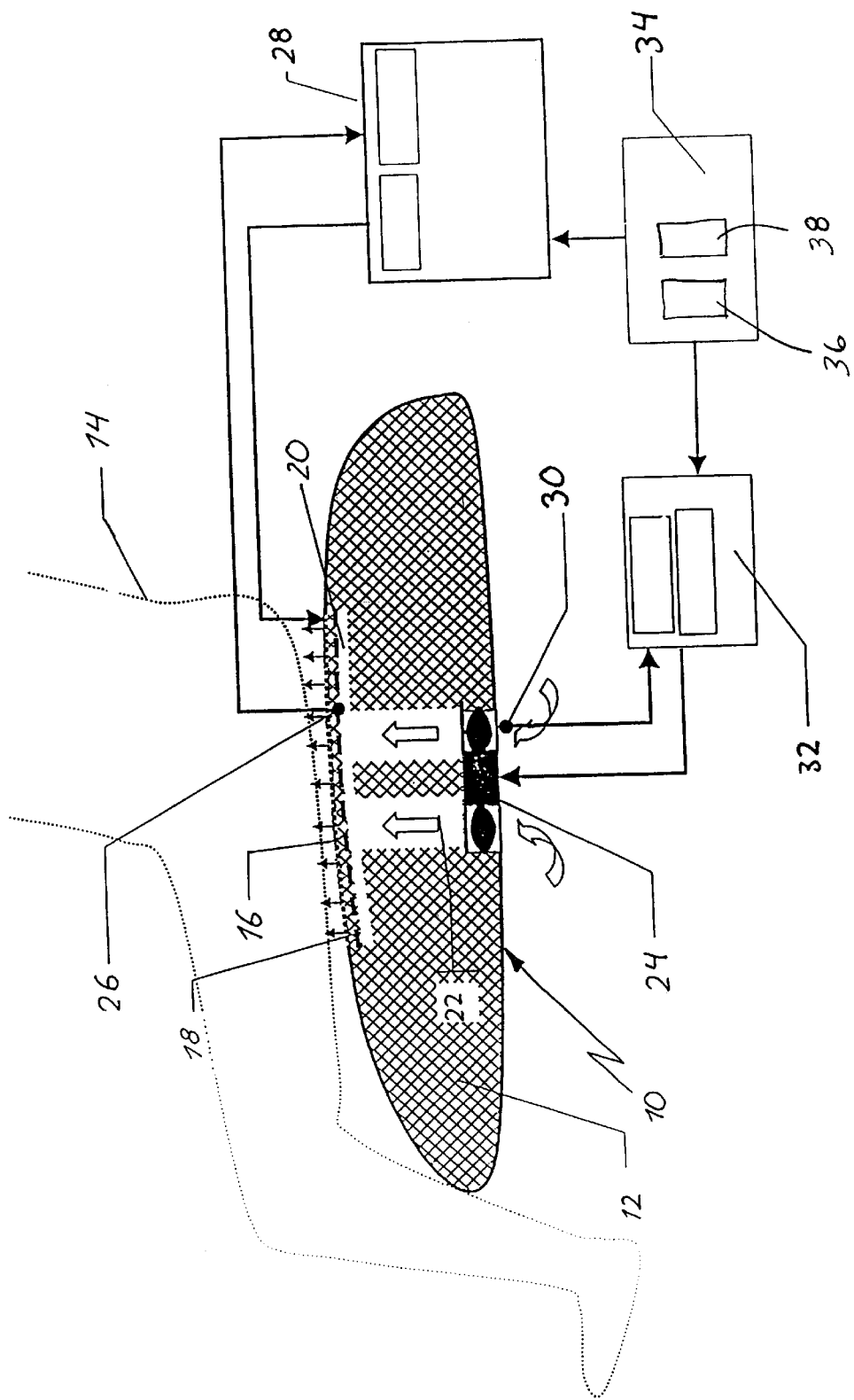
FIG. 1 is a schematic view of a vehicle seat according to one embodiment of the present invention.

In the following description, one example of a vehicle seat according to the present invention is provided. While the invention is described with respect to a vehicle seat system, the present invention may be adapted and used in other applications including furniture and office seating products, airline seats, or any other seating applications wherein climate control is desireable.

In the following description, various operating parameters and components are described for one constructed embodiment. These specific parameters and components are included as examples and are not meant to be limiting.

Referring now to FIG. 1, the vehicle seat 10 includes a seat pad 12. In the region where a vehicle passenger 14 sitting on the pad 12 is in contact with the pad 12, an air-permeable pad surface area 16 is provided. Adjacent and beneath the pad surface area 16, a surface heating element 18 is arranged, and is, likewise, air-permeable. A suitable surface heating element is described for example in DE 199 20 451 A1.

Below the surface heating element 18 is an air chamber 20 sustained by an air-permeable supporting material such as, for example, a spacer web. An air passage 22 of circular cross-section opens into the air chamber 20 and extends to the under side of the pad 12. Alternatively, several air passages may be provided which may have a circular or other cross-section such as hexagonal. In the lower end of the air passage 22, a fan in the form of a blower 24 is arranged.

To detect the temperature of the surface heating element 18, a temperature sensor 26 such as a negative-temperature coefficient (NTC) temperature sensor is arranged. The sensor 26 provides a signal (parameter) corresponding to the temperature of the surface heating element 18 on to a heat regulator 28. Heat regulator 28 includes electronics and logic for maintaining the heating element 18 at a desired temperature as set by the operator or HVAC system. The heat regulator 28 operates by known methods such as by feedback created as a function of the signal from temperature sensor 26. Indeed, the present invention is advantageous in that the heat element control scheme can be quite simple. At the intake end of the blower 24, another temperature sensor 30 in the form of a NTC sensor is provided, which detects the temperature of the interior air aspirated by the blower 24. The sensor 30 provides a signal corresponding to that temperature to a blower-regulator 32.

The blower-regulator 32 includes drive electronics and logic by which the rotational speed of the blower 24 is regulated as a function of the temperature detected by the sensor 30. The intake air which is aspirated by the blower 24 passes through the air passage 22, air chamber 20, surface heating element 18 and surface area 16 of the pad.

A Controller 34 is connected in operative communication with the blower-regulator 32 and to the heat regulator 28. The controller 34 may be an application specific integrated circuit (ASIC), a logic device, microprocessor, microprocessor-based controller or the like. On the controller 34, the passenger 14 can set a target temperature for the surface heating element 18 by way of operator input 36. The heat regulator 28 detects an actual temperature of the surface heating element 18 from the parameter passed on by the temperature sensor 26, and compares this actual temperature with the target temperature communicated by the controller 34. The surface heating element 18 is then regulated so that the actual temperature corresponds to the target temperature.

The controller 34 further includes an on-off switch 38 regulated by which the blower-regulator 32 can be switched on and off at the option of the passenger 14.

In operation, in response to an operator-desired temperature setting, heat regulator 28 regulators the heating element 18 as a function of the temperature signal provided by temperature sensor 26 to maintain the heating element 18 at the operator-desired temperature. The controller 34 includes logic operative to activate the fan/blower regulator 32 as a function of the vehicle interior ambient air temperature as determined by the temperature sensor 30. Specifically, the controller logic operates to activate the fan/blower regulator 32 at a low speed (small volume flow of air) when the interior air temperature of the vehicle is low. At higher interior air temperatures, the logic is operative to provide a higher fan/blower speed (large volume flow of air). In this way, the system ensures that the volume flow of air is heated to a physiologically acceptable temperature level before it is circulated to the pad surface area 16.

The control logic is thus operative to regulate the volume flow of air as a function of the temperature valve provided by the record temperature sensor 30. The functional relationship may be linear or nonlinear. In another embodiment, the control logic is operative to regulate the volume flow of air as function of the difference between the temperature values provided by the first and second temperature sensors 26, 30. For example, when the difference between the two temperature values is small, the fan/blower is commanded to provide a small volume flow of air and, when the temperature difference is relatively large, a large volume flow of air is commanded. Again, the volume flow of air can be regulated linearly or nonlinearly as a function of the difference in temperature values.

From the foregoing, it can be seen that there has been brought to the art a new and improved vehicle seat which has advantages over previous climate controlled vehicle seats. While the invention has been described in connection with one or more embodiments, it should be understood that the invention is not limited to these embodiments. For example, the invention is not limited to a seat pad 12. A backrest pad may be aerated and heated in like manner. Accordingly, the invention covers all alternatives, modifications and equivalents as may be included within the spirit and scope of the appended claims.

What is claimed is:

1. A vehicle seat comprising:
   at least one pad comprising an air-permeable surface area;
   an air-permeable heating element arranged proximate the air-permeable surface area of the pad to heat the surface area of the pad;
   a fan unit for forcing air through the heating element and the surface area of the pad;
   a first temperature sensor remote from the heating element for providing a first temperature value indicative of the temperature of ambient air aspirated by the fan unit; and
   a controller in operative communication with the fan unit and the first temperature sensor, the controller adapted to operate the fan unit to regulate a volume flow of air as a function of the first temperature value.

2. A vehicle seat according to claim 1 wherein said controller is adapted to operate the fan unit to provide a relatively lower volume of air flow when the first temperature value is low and a relatively higher volume of air flow when the first temperature value is high.

3. A vehicle seat according to claim 1 wherein said fan unit comprises a blower.

4. A vehicle seat according to claim 1 further comprising an operator interface comprising a seat temperature selection mechanism and fan unit activation mechanism.

5. A vehicle seat comprising:
   at least one pad comprising an air-permeable surface area;
   an air-permeable heating element arranged proximate the air-permeable surface area of the pad to heat the surface area of the pad;
   a fan unit for forcing air through the heating element and the surface area of the pad;
   a first temperature sensor for providing a first temperature value indicative of the temperature of air aspirated by the fan unit;
   a second temperature sensor proximate the heating element for providing a second temperature value indicative of the seat pad temperature proximate the heating element; and
   a controller in operative communication with the fan unit, the first temperature sensor and the second temperature sensor, the controller adapted to operate the fan unit to regulate a volume flow of air as a function of the first and second temperature values.

6. A vehicle seat according to claim 5 wherein said controller is adapted to operate the fan unit to regulate a volume flow of air as a function of a difference between the first and second temperature values.

7. A vehicle seat according to claim 6 wherein said controller is adapted to operate the fan unit to provide a relatively lower volume of air flow when the difference between the first and second temperature values is low and a relatively higher volume of air flow when the difference between the first and second temperature values is high.

8. A vehicle seat according to claim 5 wherein said controller is adapted to maintain said heating element at an operator-defined temperature value as a function of the second temperature value.

9. A vehicle seat comprising:
   at least one pad comprising an air-permeable surface area;
   an air-permeable heating element arranged proximate the air-permeable surface area of the pad to heat the surface area of the pad;
   a fan unit for forcing air through the heating element and the surface area of the pad;
   a first temperature sensor comprising a negative temperature coefficient sensor for providing a first temperature value indicative of the temperature of air aspirated by the fan unit; and
   a controller in operative communication with the fan unit and the first temperature sensor, the controller adapted to operate the fan unit to regulate a volume flow of air as a function of the first temperature value.

10. A vehicle seat comprising:
    at least one pad comprising an air-permeable surface area;
    an air-permeable heating element arranged proximate the air-permeable surface area of the pad to heat the surface area of the pad;
    a fan unit for forcing air through the heating element and the surface area of the pad;
    a first temperature sensor for providing a first temperature value indicative of the temperature of air aspirated by the fan unit;
    a second temperature sensor proximate the heating element for providing a second temperature value indicative of the temperature of the heating element or surface area of the pad;
    an operator interface comprising a seat temperature selection mechanism; and
    a controller in operative communication with the heating element, fan unit and the first and second temperature sensors, the controller adapted to operate the fan unit to regulate a volume flow of air as a function of the first temperature value and maintain said heating element at an operator-defined temperature value as a function of the second temperature value.

11. A vehicle seat according to claim 10 wherein at least one of said first and second temperature sensors comprises a negative temperature coefficient sensor.

12. A vehicle seat according to claim 10 wherein said controller is adapted to operate the fan unit to provide a relatively lower volume of air flow when the first temperature value is low and a relatively higher volume of air flow when the first temperature value is high.

13. A vehicle seat according to claim 10 wherein said controller is adapted to operate the fan unit to regulate a volume flow of air as a function of a difference between the first and second temperature values.

14. A vehicle seat according to claim 13 wherein said controller is adapted to operate the fan unit to provide a relatively lower volume of air flow when the difference between the first and second temperature values is low and a relatively higher volume of air flow when the difference between the first and second temperature values is high.

15. A vehicle seat according to claim 10 wherein said fan unit comprises a blower.

16. A method of heating a vehicle seat comprising:
    receiving an operator-defined temperature value;
    controlling an air-permeable heating element arranged proximate an air-permeable surface area of a pad of the seat to maintain said heating element at a temperature corresponding to said operator-defined temperature value;
    providing a fan unit in fluid communication with said heating element for forcing air through the heating element and the surface area of the pad;
    receiving a first temperature value of air inducted into said fan unit from a first temperature sensor remote from said heating element, said first temperature value indicative of the temperature of air aspirated by the fan unit; and
    controlling the fan unit to regulate a volume flow of air as a function of the first temperature value.

17. A method according to claim 16 wherein controlling comprises operating the fan unit to provide a relatively lower volume of air flow when the first temperature value is low and a relatively higher volume of air flow when the first temperature value is high.

18. A method according to claim 16 comprising receiving a second temperature value indicative of the seat pad temperature proximate to the heating element, and wherein controlling comprises operating the fan unit to regulate a volume flow of air as a function of a difference between the first and second temperature values.

19. A method according to claim 18 wherein controlling comprises operating the fan unit to provide a relatively lower volume of air flow when the difference between the first and second temperature values is low and a relatively higher volume of air flow when the difference between the first and second temperature values is high.

* * * * *